Figure 1:
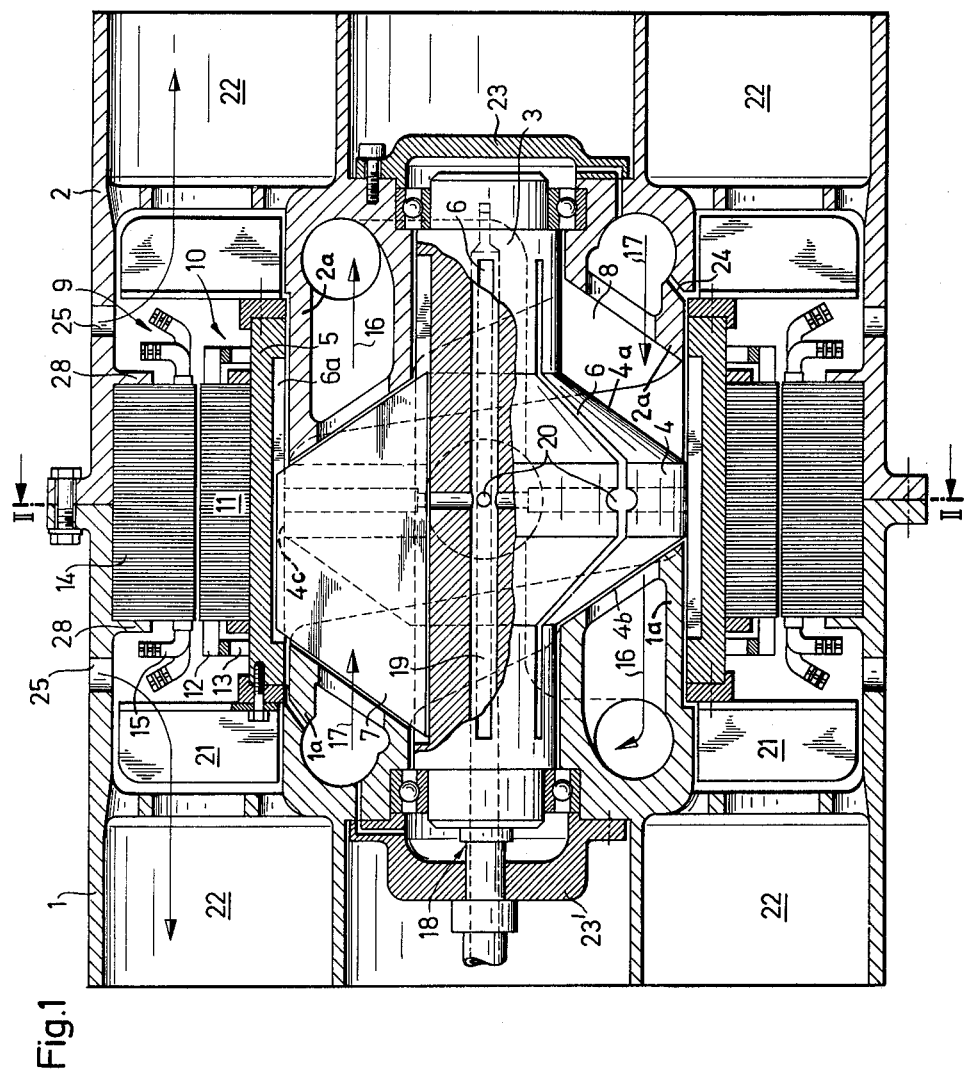

United States Patent [19]
Savikurki

[11] 3,874,823
[45] Apr. 1, 1975

[54] COMPRESSOR

[76] Inventor: Auvo A. Savikurki, Nekala, Tampere, Finland

[22] Filed: July 23, 1973

[21] Appl. No.: 381,579

[52] U.S. Cl.................................. 417/356, 310/62
[51] Int. Cl............................................ F04b 17/00
[58] Field of Search................... 417/355, 356, 357; 418/219; 310/62, 63

[56] References Cited
UNITED STATES PATENTS

| 2,020,611 | 11/1935 | Knapp | 418/219 |
|---|---|---|---|
| 2,154,456 | 4/1939 | Knapp | 418/219 |
| 2,324,434 | 7/1943 | Shore | 417/356 |
| 2,761,078 | 8/1959 | McAdam | 417/356 |
| 2,871,793 | 2/1959 | Michie et al. | 417/356 |
| 2,898,032 | 8/1959 | Katzenberger | 417/356 |
| 3,719,436 | 3/1973 | McFarlin | 417/356 |
| 3,762,841 | 10/1973 | Savikurki | 418/219 |

*Primary Examiner*—C. J. Husar
*Attorney, Agent, or Firm*—Dennison, Dennison, Townshend & Meserole

[57] ABSTRACT

A compressor of the type having vanes reciprocable along a rotor shaft through slots in a rotor under the guidance of stationary guide surfaces on the rotor, and a cylindrical mantle extending around the vanes and secured for rotation with the rotor, has the improvement that an electric motor rotor is provided around and secured to the exterior of the cylindrical space to save space and expense. The motor stator is secured to the inner side of a housing enclosing the motor rotor and the cylindrical mantle, and the housing has mutually opposed end portions in which the rotor shaft is journalled.

11 Claims, 2 Drawing Figures

COMPRESSOR

The present invention relates to compressors.

In one known type of compressor, there is provided a compressor housing which contains a rotor comprising a shaft rotatably carried in end portions of the housing. A flange projects from the shaft and a cylindrical mantle surrounds the flange. In a compressor chamber between the shaft and the cylinder mantle, vanes extend through slots in the rotor flange, the vanes having an axial freedom of motion, and reciprocal axial movement of the vanes on rotation of the rotor, being effected by guide surfaces provided on the inner faces of the opposing housing end portions.

In this known type of compressor, a drive motor spaced axially from the compressor chamber is provided on an extension of the rotor shaft or connected to the rotor shaft by a coupling.

It is an object of the present invention to provide a novel and improved compressor in which the electric motor is arranged as efficiently as possible, and to accommodate the motor in a small space.

According to the present invention, there is provided a compressor, comprising a housing having a pair of opposed housing end portions, a rotor shaft which is journalled in the housing end portions and which has a rotor extending radially from the shaft with a cylindrical mantle extending around the rotor, a plurality of vanes extending through the rotor and slidable longitudinally of the shaft in a compressor chamber between the shaft and the cylindrical mantle, stationary vane guide surfaces extending around the shaft for effecting reciprocation of the vanes longitudinally of the shaft on rotation of the shaft to draw in fluid through an inlet and to discharge the fluid through an outlet, and an electric motor for effecting the rotation of the shaft, the electric motor having a motor rotor extending around the exterior of and secured to, the cylindrical mantle.

Thus, it has been possible to build the compressor according to the invention with the compressor motor within the electric motor. It follows that the compressor rotor and the electric motor rotor have a common shaft. This has the advantage, in addition to simplicity of design and space economy, that no stuffing of the shaft bearings is required because there is no mechanical power take-off from the shaft and, consequently, blind bearing end shields may be used for the shaft.

It is to be noted, however, that the arrangement according to the invention is not intended for use in connection with all and any compressors: it is expressly allowed by an axial compressor of the type specified hereinbefore wherein the motion of the vanes is axial. In so-called eccentric compressors with radial motion of the vanes, this arrangement is not feasible.

An embodiment of the invention is described hereinafter in greater detail with reference to the accompanying drawings, wherein:

FIG. 1 presents a view taken in axial section through a compressor; and

Figure 2:
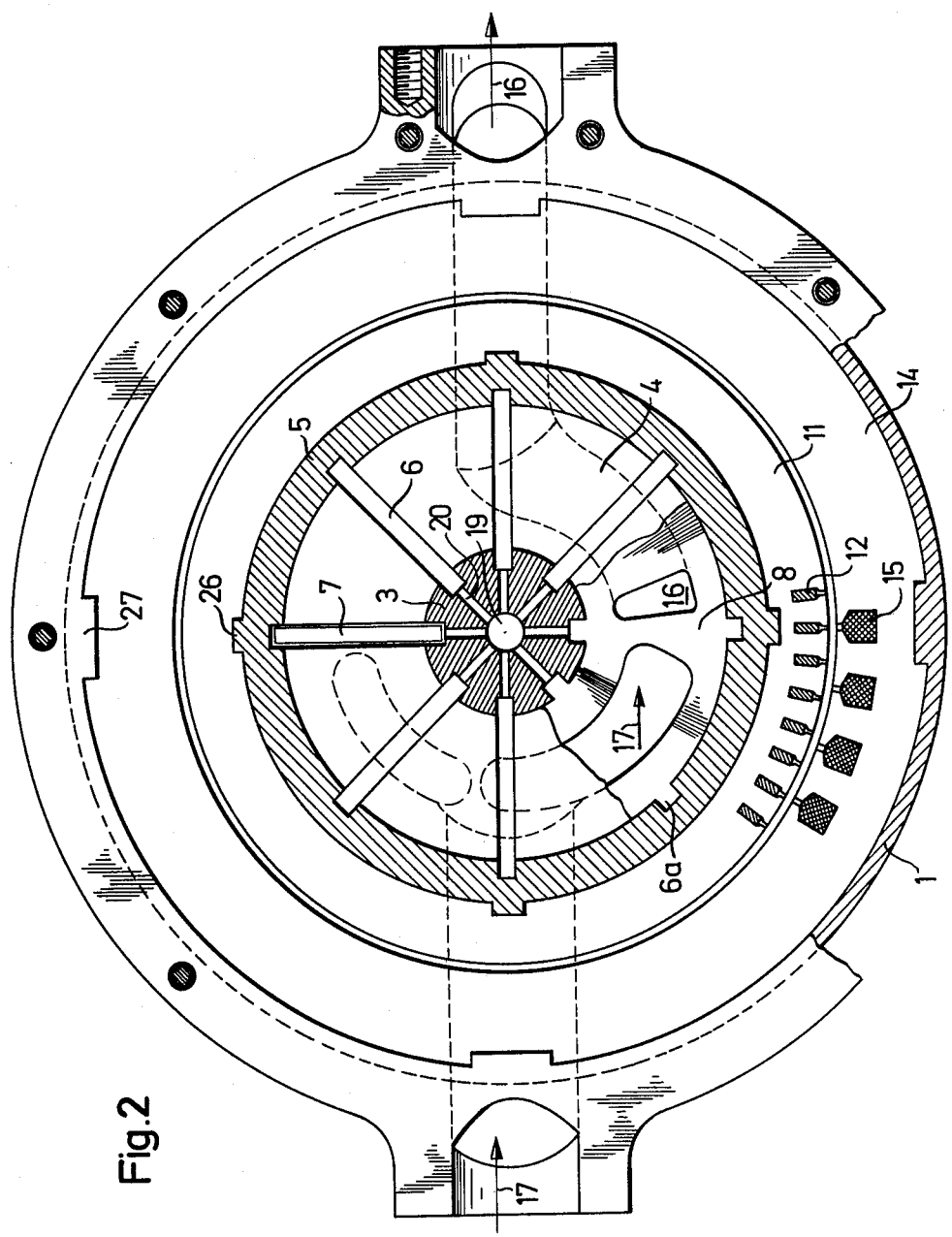

FIG. 2 shows a view of the compressor taken in section along line II—II of FIG. 1.

The compressor according to the embodiment of the invention shown in the drawings comprises two housing end portions 1 and 2, which are secured together in mutual opposition and which constitute a compressor housing.

The ends of a rotor shaft 3 are journalled in central bores in the end portions 1 and 2, and a rotor 4 extending radially outwardly from the shaft 3 divides the housing into two parts, so that end chambers are formed between the rotor 4 and the inner faces of the opposed housing end portions 1 and 2. The rotor 4 is traversed by slots 6 housing axially movable vanes 7, the axial movements of which are governed by guide surfaces 8 formed on the opposed housing end portions 1 and 2. Slots 6 slidably receiving the radially innermost edges of the vanes 7 are extended along the shaft 3.

Of particular significance is a cylindrical mantle 5 surrounding and secured to the rotor 4. It is most advantageous with regard to design to provide the cylindrical mantle 5 separate from the rotor 4 and fixed by screws around the periphery to the rotor 4.

In the cylindrical mantle 5, grooves 6a are provided for slidably receiving the outer edges of the vanes 7. One important function of the cylindrical mantle 5 is to prevent the wear of the outer edges of the vanes 7, which would take place if the edges of the vanes were to drag along the inner surface of a stationary housing under the action of centrifugal force, as necessarily occurs e.g., in centrifugal pumps.

The rotor 4 has oppositely facing frusto-conical side faces 4a, 4b, the larger diameter ends of which are joined by a cylindrical surface 4c. The cylindrical mantle 5 has been affixed to this cylindrical rotor surface 4c and rotates with the rotor 4. The cylindrical mantle 5 encircles tightly by its two ends cylindrical portions 1a and 2a of the housing end portions 1 and 2.

The vanes 7 movable longitudinally of the shaft 3 in a compressor chamber axially between the shaft 3 and the cylindrical mantle 5, are shaped as regular trapezes, their longer side resting in the shaft grooves 6 and their shorter sides engaging in grooves 6a in the cylindrical mantle 5. The vanes 7 have a length such that their oblique ends engage with a slide fit the guide surfaces 8 provided on the housing end portions 1 and 2.

The guide surfaces 8 have a shape such that on rotation of the rotor, the motion of the vanes 7, developed into a plane, is sinusoidal. One wavelength of the sine curve of this motion corresponds to one revolution of the rotor. As can best be seen from FIG. 2, there is an intake port 17 in each housing end portion, which intake is opposite to a suction zone in the compressor chamber, and a discharge port 16 at the end of each compression zone in the compressor chamber. The discharge ports 16 on both sides of the rotor 4 have been connected in parallel to a common deliver duct, and similarly both intake ports 17 have been connected in parallel to a common intake duct. Alternatively, both halves of the housing may also be connected in series in order to obtain a higher pressure.

The shape of the guide surfaces 8 may also be different from that described above, as long as during each revolution of the rotor there occur one or several minima and maxima axially displaced with reference to each other, under effect of which the vanes 7 execute a forced, reciprocating motion parallel to the rotor shaft 3, whereby 5 with reference to each other, outwardly projecting, axial ribs 26 are provided on the cylindrical mantle 5 and engage with corresponding grooves on the inner side of the lamination stack 11. In the embodiment illustrated, the motor 9 is a motor with a short-circuited rotor, its rotor winding 10 being a squirrel-cage winding with short-circuiting bars 12 and short-circuiting rings 13 connecting these at both ends.

The stator lamination stack 14, is mounted on cylindrical inner surfaces of the housing end portions 1 and 2 and clamped between appropriate fixing lugs 28. The cylindrical inner surfaces of the end portions 1 and 2 have axial ribs 27, which enter mating grooves in the stator stack. Furthermore, the stator of the electric motor 9 has been provided with a conventional stator winding 15. When the current of the stator winding 15 is switched on, the combined electric motor and compressor rotors begin to rotate.

Since no take-off is required from the rotor shaft 3, it is possible to cover both end bearings of the shaft with so-called blind bearing shields 23 and 23'.

For the purpose of cooling the electric motor 9, cooling vanes 21 attached to the ends of the cylindrical mantle 5 and draw cooling air through apertures 25 in the end portions 1 and 2. The heat generated in the motor winding passes through the rotor lamination stack 21 and through the cylindrical mantle 5 into the compressor housing, which therefore has to be cooled efficiently. This need of additional cooling is taken care of by means of a greater than normal oil quantity, which is used, at the same time, for lubrication and for sealing. A considerable quantity of oil, in fact up to about 9.6 per cent of the air volume (in normal conditions) delivered by the compressor, is continuously conducted through the rotary connection 18 and the duct system 19,20 into the compressor chamber, where a transfer of heat into the oil takes place. The cooling, lubricating and sealing oil is then conducted, together with the compressed air, into a reservoir, whence it is further conducted under effect of the pressure in this reservoir into cooling tubes or a cooling radiator (not depicted) in end spaces 22 of the compressor, which are cooled by the aid of the cooling vanes 21. The cooled oil is reintroduced into the housing through the rotating juncture 18.

In order that no oil leakage might occur across the sealing between the cylindrical mantle 5 and the housing, the annular zone beyond this seal is connected with the intake duct 17 by bores 24, through which the oil trickling past the seals is collected for return into the housing.

It should be understood that the embodiment presented in the foregoing is merely one of numerous possible applications of the invention. For instance, the electric motor may be replaced by a synchronous motor or a direct current motor.

I claim:

1. A compressor, comprising, in combination, a compressor housing;
said compressor housing comprising a pair of opposed housing end portions;
a rotor shaft journalled in said housing end portions;
a compressor rotor projecting radially from said rotor shaft;
a cylindrical mantle extending around said compressor rotor and secured to said compressor rotor for rotation therewith;
means defining a plurality of slots in said compressor rotor;
a plurality of vanes extending through the rotor slots and slidable longitudinally of said rotor shaft in a compressor chamber between said rotor shaft and said cylindrical mantle;
means defining a fluid inlet and a fluid outlet communicating with the compressor chamber;
stationary vane guide surfaces extending around said shaft for effecting reciprocation of said vanes longitudinally of said rotor shaft on rotation of said rotor shaft;
whereby fluid is drawn in through the fluid inlet and discharged through the fluid outlet on rotataion of said rotor shafts; and
an electric motor for rotating said rotor shaft;
said electric motor comprising a motor rotor extending around the exterior of and secured to said cylindrical mantle, said housing end portions comprising opposed stationary cylindrical portions at opposite sides of said compressor rotor; and
said cylindrical mantle having opposite ends which tightly encircle said cylindrical portions, whereby said compressor chamber is separated from said electric motor.

2. A compressor as defined in claim 1, wherein said electric motor is a short-circuited motor and comprises rotor laminations mounted around said cylindrical mantle, and a squirrel-cage winding.

3. A compressor as defined in claim 1, wherein said end housing portions are secured together and have cylindrical inner surfaces, and said electric motor has a stator mounted on said inner surfaces.

4. A compressor as defined in claim 1, further comprising cooling vanes secured to said cylindrical mantle.

5. A compressor as defined in claim 1, further comprising means defining an oil supply bore communicating with the compressor chamber for cooling, sealing and lubricating said compressor, and means defining an oil discharge passage communicating with said fluid outlet.

6. A compressor as defined in claim 1, and further comprising blind bearing shields covering opposite ends of said rotor shaft.

7. A compressor as defined in claim 1, further comprising cooling vanes secured to said cylindrical mantle.

8. A compressor as defined in claim 7, further comprising means defining an oil supply bore communicating with the compressor chamber for cooling, sealing and lubricating said compressor, and means defining an oil discharge passage communicating with said fluid outlet.

9. A compressor as defined in claim 1 wherein said vanes are of trapezoidal shape, said vanes having their mutually parallel edges extending parallel to the axis of said rotor shaft, and wherein said guide surfaces are inclined to the shaft at the same angles as the other edges of said vanes.

10. A compressor as defined in claim 9, further comprising means defining grooves extending longitudinally of said rotor shaft and slidably receiving the radially innermost edges of said vanes.

11. A compressor as defined in claim 9, further comprising means defining grooves on the inner side of said cylindrical mantle and extending parallel to the axis of said rotor shaft, the radially outermost edges of said vanes being slidably received in said grooves.

* * * * *